(12) United States Patent
Hatakeyama

(10) Patent No.: US 12,038,875 B2
(45) Date of Patent: Jul. 16, 2024

(54) DIGEST VALUE CALCULATING DEVICE, ACCESS DEVICE, DIGEST VALUE CALCULATING METHOD, ACCESS METHOD, AND PROGRAM

(71) Applicant: SONY INTERACTIVE ENTERTAINMENT INC., Tokyo (JP)

(72) Inventor: Akiyuki Hatakeyama, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 173 days.

(21) Appl. No.: 17/625,039

(22) PCT Filed: Jul. 21, 2020

(86) PCT No.: PCT/JP2020/028297
§ 371 (c)(1),
(2) Date: Jan. 5, 2022

(87) PCT Pub. No.: WO2021/015203
PCT Pub. Date: Jan. 28, 2021

(65) Prior Publication Data
US 2022/0292062 A1    Sep. 15, 2022

(30) Foreign Application Priority Data
Jul. 23, 2019   (JP) ................................. 2019-135538

(51) Int. Cl.
*G06F 16/00*   (2019.01)
*G06F 16/17*   (2019.01)
*G06F 16/174*  (2019.01)
*G06F 16/178*  (2019.01)

(52) U.S. Cl.
CPC ...... *G06F 16/1748* (2019.01); *G06F 16/1734* (2019.01); *G06F 16/1787* (2019.01)

(58) Field of Classification Search
CPC ............. G06F 16/1748; G06F 16/1734; G06F 16/1787; G06F 16/164; G06F 16/174; G06F 16/13; G06F 21/64
See application file for complete search history.

(56) References Cited

U.S. PATENT DOCUMENTS 10,649,852 B1 *   5/2020  Starling ............... G06F 11/1469
2019/0080059 A1 * 3/2019  Takumi .................. G06F 21/44

FOREIGN PATENT DOCUMENTS

| CN | 104618329 A | * | 5/2015 |
| JP | 2010-146308 A | | 7/2010 |
| JP | 2011133971 A | * | 7/2011 ....... G06F 17/30091 |

OTHER PUBLICATIONS

International Search Report and Written Opinion mailed Oct. 13, 2020, from PCT/JP2020/028297, 9 sheets.

* cited by examiner

*Primary Examiner* — Alexander Khong
(74) *Attorney, Agent, or Firm* — XSENSUS LLP

(57) ABSTRACT

Provided are a digest value calculating device, an access device, a digest value calculating method, an access method, and a program that have a small possibility of collision between digest values even though a digest value calculation load is light. A parameter value determining section (22) determines a value of a common parameter used in common for each of a plurality of paths respectively associated with inodes. A digest value calculating section (24) calculates, for each of the plurality of paths, a digest value corresponding to the path on the basis of the value of the common parameter and a name of the path. A record generating section (28) associates the digest value corresponding to the path and an inode corresponding to the path with each other.

6 Claims, 8 Drawing Sheets

FIG.7

```
uint64_t a[3]; // internal state
static const uint64_t rc = 0x8000000080008081ULL;

void init( uint64_t initialization_vector ) {
    a[0] = rotate( initialization_vector, 0 );
    a[1] = rotate( initialization_vector, 11 );
    a[2] = rotate( initialization_vector, 23 );
}                                                          (1)

uint64_t last( uint64_t last_input, uint64_t finalization_vector ) {
    return round( last_input ^ finalization_vector );
}                                                          (3)

uint64_t round( uint64_t round_input ) {
    uint64_t t[3], v[3];
    a[0] ^= round_input;
    v[0] = rotate( a[1] ^ a[2], 5 );
    v[1] = rotate( a[2] ^ a[0], 17 );
    v[2] = rotate( a[0] ^ a[1], 1 );
    t[0] = rotate( a[0] ^ v[0], 53 );
    t[1] = rotate( a[1] ^ v[1], 11 );
    t[2] = rotate( a[2] ^ v[2], 59 );
    a[0] = t[0] ^ ( ~t[1] & t[2] ) ^ rc;
    a[1] = t[1] ^ ( ~t[2] & t[0] );
    a[2] = t[2] ^ ( ~t[0] & t[1] );
    return a[0];
}                                                          (2)
```

DIGEST VALUE CALCULATING DEVICE, ACCESS DEVICE, DIGEST VALUE CALCULATING METHOD, ACCESS METHOD, AND PROGRAM

TECHNICAL FIELD

The present invention relates to a digest value calculating device, an access device, a digest value calculating method, an access method, and a program.

BACKGROUND ART

In UNIX (registered trademark), information regarding an object in a file system of files, directories, or the like is recorded in an inode. When an object such as a file or a directory is generated, one inode is assigned to the object. That is, the object and the inode are associated with each other on a one-to-one basis.

In addition, a technology is known which increases the speed of access to the inode by managing a digest value corresponding to the path of the object and an inode number as identification information of the inode in association with each other. This technology calculates the digest value corresponding to the object on the basis of the path of the object. Then, the inode number corresponding to the digest value is identified. The access to the inode can be increased in speed by managing the digest value in ascending order or descending order, and using a search method such as a binary search.

Here, a digest value corresponding to a new object may collide with the digest value corresponding to the already existing object. In this case, for these objects, a collision resolver is generated which manages the paths of the objects and the inode numbers in association with each other. Then, for these objects, a full-text matching search of the collision resolver is performed with the paths as a key at a time of identifying the inode numbers. Thus, access to the inodes takes time.

SUMMARY

Technical Problems

In a system in which it is guaranteed that new objects are not generated, the collision resolver is not necessary when digest values that correspond to respective paths and not collide with each other are determined at a time that the paths of all objects are determined.

Here, the use of a simple algorithm for calculating the digest values increases a possibility of collision between digest values. On the other hand, a digest value calculation load needs to be reduced in order to increase the speed of access to an inode.

The present invention has been made in view of the above-described actual situation. It is one of objects of the present invention to provide a digest value calculating device, an access device, a digest value calculating method, an access method, and a program that have a small possibility of collision between digest values even though a digest value calculation load is light.

Solution to Problems

In order to solve the above problems, a digest value calculating device according to the present invention includes a parameter value determining section configured to determine a value of a common parameter used in common for each of a plurality of paths respectively associated with inodes, a digest value calculating section configured to calculate, for each of the plurality of paths, a digest value corresponding to the path on the basis of the value of the common parameter and a name of the path, and an associating section configured to associate the digest value corresponding to the path and an inode corresponding to the path with each other.

One mode of the present invention further includes an identifying section configured to identify collision between the calculated digest values, the parameter value determining section changes the value of the common parameter when the collision between the digest values is identified, and the digest value calculating section recalculates the digest value on the basis of the value of the common parameter after the change.

Alternatively, the parameter value determining section determines a value of a first common parameter and a value of a second common parameter, the digest value calculating section calculates a value of an internal state on the basis of a part of the name of the path and the value of the first common parameter, and the digest value calculating section recalculates the digest value on the basis of the value of the internal state, a remainder of the name of the path, and the value of the second common parameter.

This mode may further include an identifying section configured to identify collision between the calculated digest values, and a retaining section configured to retain the value of the internal state. The parameter value determining section may change the value of the second common parameter when the collision between the digest values is identified, and the digest value calculating section may recalculate the digest value on the basis of the retained value of the internal state and the value of the second common parameter after the change.

Further, when the collision between the digest values is identified, the parameter value determining section may change either the value of the first common parameter or the value of the second common parameter according to a mode of the collision, in a case where the value of the second common parameter is changed, the digest value calculating section may recalculate the digest value on the basis of the retained value of the internal state and the value of the second common parameter after the change, and, in a case where the value of the first common parameter is changed, the digest value calculating section may recalculate the value of the internal state and the digest value on the basis of the value of the first common parameter after the change.

In addition, an access device according to the present invention includes a storage section configured to store data representing a value of a common parameter and correspondence between a digest value and an inode, a path name identifying section configured to identify a name of a path, a digest value calculating section configured to calculate the digest value corresponding to the name of the path on the basis of the value of the common parameter, the value of the common parameter being represented by the data, and an access section configured to access the inode associated with the calculated digest value in the data.

In addition, a digest value calculating method according to the present invention includes a step of determining a value of a common parameter used in common for each of a plurality of paths respectively associated with inodes, a step of calculating, for each of the plurality of paths, a digest value corresponding to the path on the basis of the value of the common parameter and a name of the path, and a step of associating the digest value corresponding to the path and an inode corresponding to the path with each other.

In addition, an access method according to the present invention includes a step of identifying a name of a path, a step of calculating a digest value corresponding to the name of the path on the basis of a value of a common parameter, and a step of accessing an inode associated with the calculated digest value in data indicating correspondence between the digest value and the inode.

In addition, a program according to the present invention makes a computer perform a procedure of determining a value of a common parameter used in common for each of a plurality of paths respectively associated with inodes, a procedure of calculating, for each of the plurality of paths, a digest value corresponding to the path on the basis of the value of the common parameter and a name of the path, and a procedure of associating the digest value corresponding to the path and an inode corresponding to the path with each other.

In addition, another program according to the present invention makes a computer perform a procedure of identifying a name of a path, a procedure of calculating a digest value corresponding to the name of the path on the basis of a value of a common parameter, and a procedure of accessing an inode associated with the calculated digest value in data indicating correspondence between the digest value and the inode.

BRIEF DESCRIPTION OF DRAWINGS

FIG. 7 is a diagram illustrating an example of a source code.

DESCRIPTION OF EMBODIMENT

One embodiment of the present invention will hereinafter be described in detail with reference to the drawings.

Figure 1:
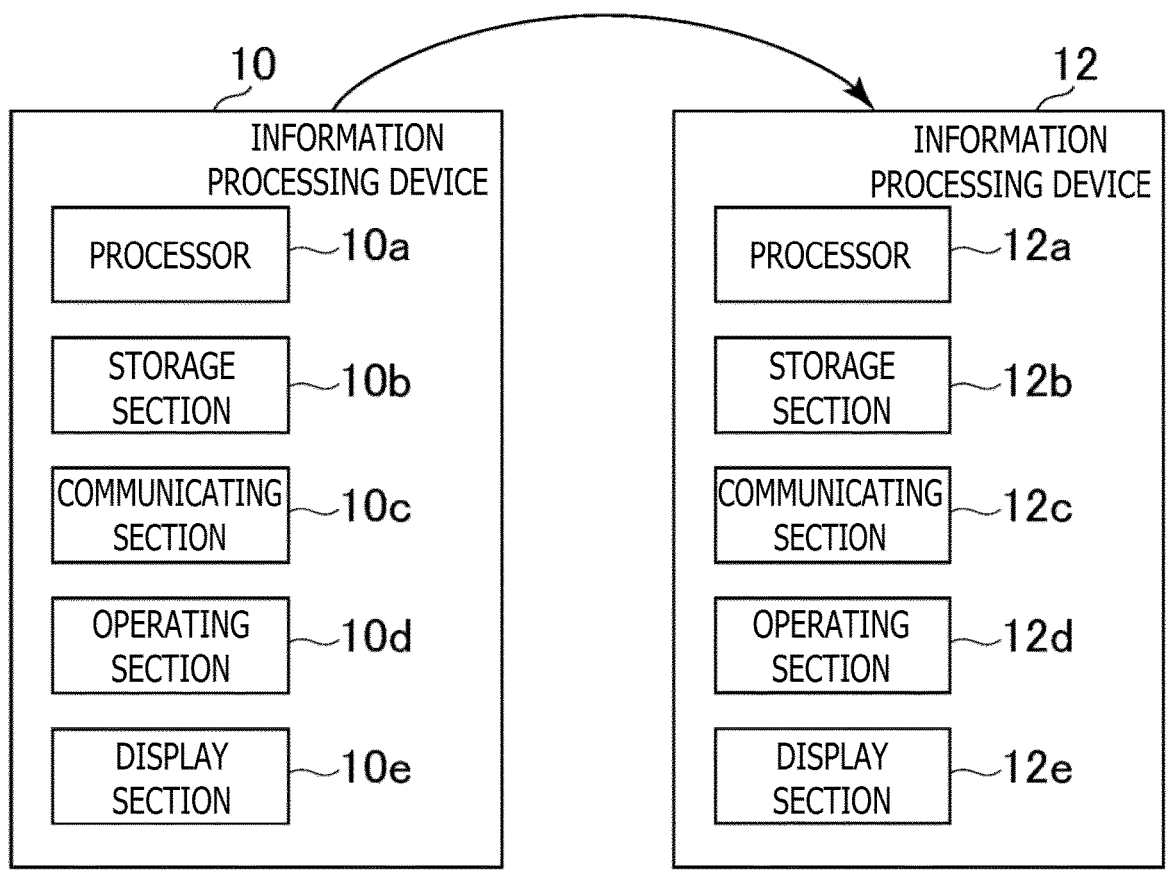
FIG. 1 is a diagram illustrating an example of a configuration of information processing devices according to one embodiment of the present invention.

FIG. 1 is a block diagram of an information processing device 10 and an information processing device 12 according to one embodiment of the present invention. The information processing device 10 and the information processing device 12 according to the present embodiment are, for example, a computer such as a game console or a personal computer.

In the present embodiment, suppose that a first user such as a program developer of a game program or the like uses the information processing device 10, and that a second user using the developed program uses the information processing device 12.

As illustrated in FIG. 1, the information processing device 10 according to the present embodiment, for example, includes a processor 10a, a storage section 10b, a communicating section 10c, an operating section 10d, and a display section 10e. In addition, the information processing device 12 according to the present embodiment, for example, includes a processor 12a, a storage section 12b, a communicating section 12c, an operating section 12d, and a display section 12e.

The processor 10a is, for example, a program control device such as a CPU (Central Processing Unit) that operates according to a program installed on the information processing device 10. The processor 12a is, for example, a program control device such as a CPU that operates according to a program installed on the information processing device 12.

The storage section 10b and the storage section 12b are a storage element such as a ROM (Read-Only Memory) or a RAM (Random Access Memory), a hard disk drive, or the like. The storage section 10b stores the program executed by the processor 10a and the like. The storage section 12b stores the program executed by the processor 12a and the like.

The communicating section 10c and the communicating section 12c are a communication interface such as a network board or a wireless LAN (Local Area Network) module.

The operating section 10d and the operating section 12d are a user interface such as a keyboard, a mouse, or a controller of a game console. The operating section 10d receives an operating input of a user, and outputs a signal indicating contents of the operating input to the processor 10a. In addition, the operating section 12d receives an operating input of the user, and outputs a signal indicating contents of the operating input to the processor 12a.

The display section 10e is a display device such as a liquid crystal display. The display section 10e displays various kinds of images according to instructions of the processor 10a. The display section 12e is a display device such as a liquid crystal display. The display section 12e displays various kinds of images according to instructions of the processor 12a.

Incidentally, the information processing device 10 and the information processing device 12 may include a communication interface such as a network board, an optical disk drive that reads an optical disk such as a DVD (Digital Versatile Disc)-ROM or a Blu-ray (registered trademark) disk, a USB (Universal Serial Bus) port, or the like.

In the present embodiment, the information processing device 12 is provided with distribution data including objects such as a plurality of files and directories and flat path table data, the distribution data being generated by the information processing device 10. Then, the information processing device 12 performs access to flat path data and the objects included in the distribution data.

Figure 2:
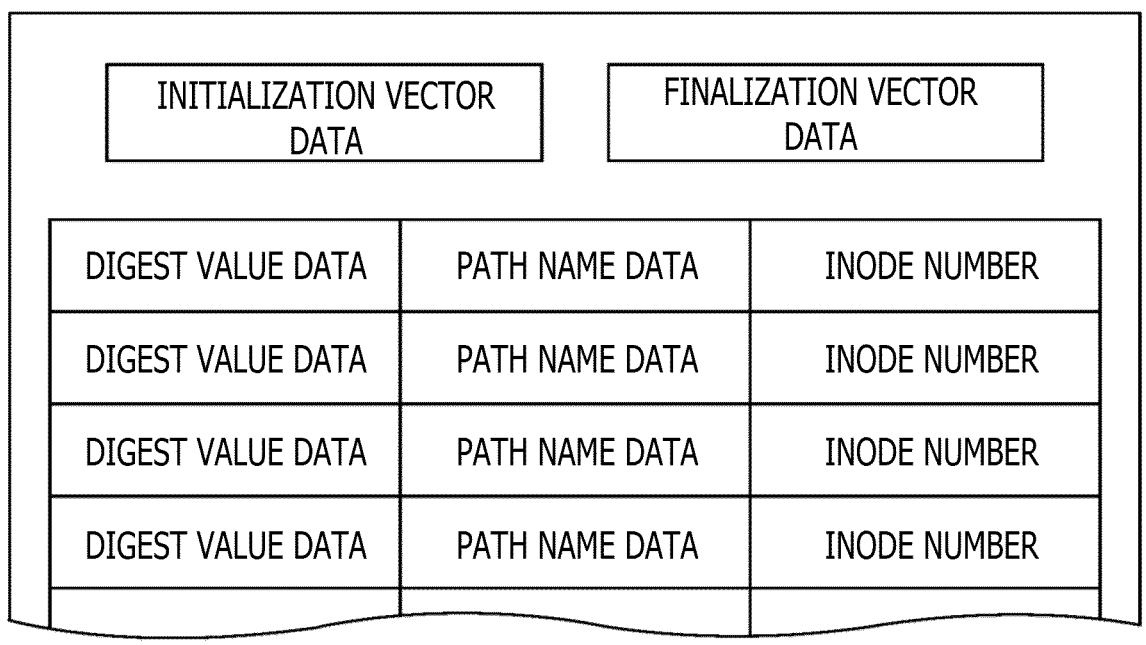
FIG. 2 is a diagram illustrating an example of a data structure of flat path table data.

FIG. 2 is a diagram illustrating an example of a data structure of the flat path table data according to the present embodiment. As illustrated in FIG. 2, the flat path table data includes a plurality of records including digest value data, path name data, and an inode number. A record is associated with an object such as a file or a directory on a one-to-one basis. In addition, the record is associated with an inode in which information regarding the object is recorded on a one-to-one basis by an inode number as identification information of the inode.

The path name (for example, the name of a full path) of the object is set as the value of the path name data of the record associated with the object. The inode number corresponding to the object is set as the inode number of the record. In addition, a digest value calculated on the basis of the path name of the object is set as the value of the digest value data included in the record associated with the object. The digest value data according to the present embodiment is, for example, data having a predetermined length of 64 bits.

In addition, the flat path table data includes data representing a common parameter used in common for each of a plurality of paths respectively associated with inodes.

The common parameter according to the present embodiment includes a first common parameter and a second common parameter. In the following, the first common parameter will be referred to as an initialization vector, and the second common parameter will be referred to as a finalization vector.

Then, suppose that the flat path table data includes initialization vector data representing the initialization vector and finalization vector data representing the finalization vector.

Suppose that the value of the initialization vector and the value of the finalization vector according to the present embodiment both have a predetermined length of 64 bits.

In the present embodiment, for example, when program development is ended and new objects cease to be generated in the information processing device 10, the generation of the flat path table data is performed, including the calculation of digest values corresponding to respective path names.

Then, the distribution data including developed objects such as files or directories and the generated flat path table data is supplied from the information processing device 10 to the information processing device 12. The distribution data may, for example, be supplied to the information processing device 12 via a computer readable information storage medium such, for example, as an optical disk, a magnetic disk, a magnetic tape, a magneto-optical disk, a flash memory, or the like or via the Internet or the like.

Then, in the present embodiment, when the information processing device 12 performs access to an object, a digest value is calculated on the basis of the value of the common parameter and the path name of the object. Then, an inode number corresponding to the digest value is identified with the calculated digest value as a key. Then, access to the inode and the object corresponding to the inode number is performed.

The records according to the present embodiment are managed in ascending order or descending order of digest values. Therefore, according to the present embodiment, an inode number can be identified quickly with a digest value as a key by using a fast search method such as a binary search.

In the following, description will be further made of functions of the information processing device 10 and the information processing device 12 according to the present embodiment and processing performed by the information processing device 10 and the information processing device 12.

Figure 3:
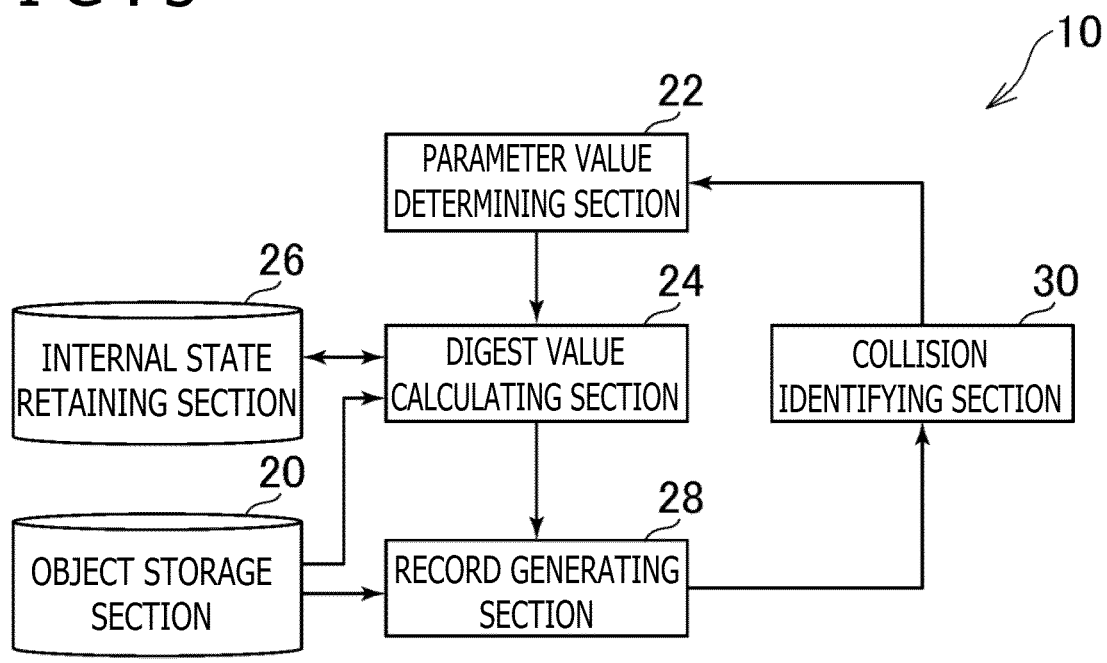
FIG. 3 is a functional block diagram illustrating an example of functions of an information processing device according to one embodiment of the present invention, the information processing device being used by a first user.

FIG. 3 is a functional block diagram illustrating an example of functions implemented in the information processing device 10 according to the present embodiment. It is to be noted that the information processing device 10 according to the present embodiment does not need to implement all of the functions illustrated in FIG. 3, and may implement functions other than the functions illustrated in FIG. 3.

As illustrated in FIG. 3, the information processing device 10 functionally includes, for example, an object storage section 20, a parameter value determining section 22, a digest value calculating section 24, an internal state retaining section 26, a record generating section 28, and a collision identifying section 30. The object storage section 20 and the internal state retaining section 26 are implemented mainly by the storage section 10b. The parameter value determining section 22, the digest value calculating section 24, the record generating section 28, and the collision identifying section 30 are implemented mainly by the processor 10a.

The above functions may be implemented by executing a program including commands corresponding to the above functions in the processor 10a, the program being installed on the information processing device 10 as a computer. This program may, for example, be supplied to the information processing device 10 via a computer readable information storage medium such as an optical disk, a magnetic disk, a magnetic tape, a magneto-optical disk, or a flash memory or via the Internet or the like.

The object storage section 20 in the present embodiment, for example, stores objects such as files or directories corresponding to a developed program and data as well as the inodes of the objects.

The parameter value determining section 22 in the present embodiment, for example, determines the value of the common parameter used in common for each of a plurality of paths associated with respective inodes. Here, for example, the value of the initialization vector of 64 bits and the value of the finalization vector of 64 bits are determined. Here, for example, the value of a pseudorandom number generated by using a pseudorandom number generating function may be used as the value of the common parameter. In addition, a value input by the user of the information processing device 10 may be determined as the value of the common parameter. In addition, the value of the initialization vector and the value of the finalization vector may be the same, or may be different from each other.

The digest value calculating section 24 in the present embodiment, for example, calculates, for each of the plurality of paths, a digest value corresponding to the path on the basis of the value of the common parameter and the name of the path. Here, as described above, a digest value of 64 bits is calculated.

Figure 4:
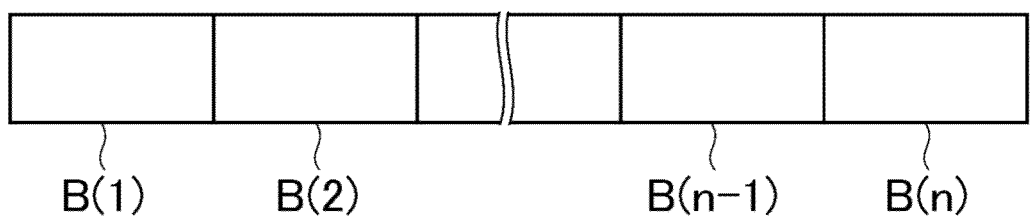
FIG. 4 is a diagram schematically illustrating an example of division of a path name.

FIG. 4 is a diagram schematically illustrating an example of division of a path name which division is performed at a time of calculation of a digest value. In the present embodiment, for example, a character code corresponding to the name of a path is divided into pieces of 64 bits (8 bytes) corresponding to eight characters. Here, in a case where the character code corresponding to the name of the path is not an integral multiple of 64 bits, a tail thereof is padded with a predetermined value (for example, zero) such that the character code becomes an integral multiple of 64 bits. In the following, data of 64 bits after the division will be referred to as a block B. In the example of FIG. 4, n blocks B(1) to B(n) are generated by the division of the path name.

In the present embodiment, for example, the digest value calculating section 24 calculates the value of an internal state on the basis of the value of the initialization vector and a part of the name of the path. For example, the digest value calculating section 24 calculates the value of the internal state on the basis of the value of the initialization vector and the value of (n−1) blocks B(1) to B(n−1) from a head. The value of the internal state according to the present embodiment is, for example, 192 (64×3) bits. Then, the digest value calculating section 24 makes the internal state retaining section 26 retain the value of the internal state.

Then, the digest value calculating section 24 calculates the digest value on the basis of the value of the internal state, the remainder of the name of the path, and the value of the finalization vector. For example, the digest value calculating section 24 calculates the digest value on the basis of the value of the internal state, the value of the block B(n) at the tail, and the value of the finalization vector.

As described above, the internal state retaining section 26 in the present embodiment, for example, retains the value of the internal state in the calculation of the digest value by the digest value calculating section 24.

The record generating section 28 in the present embodiment, for example, generates a record including path name data representing the name of the path of an object, digest value data representing the digest value calculated on the basis of the name of the path, and the inode number of the object. Records thus generated are managed in ascending order or descending order of the values of digest value data. Thus, the record generating section 28 associates the digest value corresponding to the path and the inode corresponding to the path with each other.

The collision identifying section 30 in the present embodiment, for example, identifies collision between calculated digest values. The collision identifying section 30, for example, identifies whether or not the newly calculated digest value coincides with one of digest values calculated on the basis of other path names.

Here, when collision is identified, the parameter value determining section 22 changes the value of the common parameter. Here, for example, the value of a new pseudorandom number may be used as the value of the common parameter after the change. In addition, for example, a value newly input by the user may be used as the value of the common parameter after the change. Then, the digest value calculating section 24 recalculates the digest value on the basis of the value of the common parameter after the change.

Here, the parameter value determining section 22 may change only the value of the finalization vector without changing the value of the initialization vector. In this case, for the path name for which the value of the corresponding internal state is retained, the digest value may be recalculated on the basis of the value of the internal state, the remainder of the name of the path (for example, the value of B(n)), and the value of the finalization vector after the change. This can shorten a time taken to recalculate the digest value.

In addition, when collision between the digest values is identified, the parameter value determining section 22 may change either the value of the initialization vector or the value of the finalization vector according to a mode of the collision. For example, the value of the initialization vector may be changed when the collision is identified predetermined times consecutively even when the value of the finalization vector is changed. In addition, in this case, both the value of the initialization vector and the value of the finalization vector may be changed.

Here, in a case where the value of the finalization vector is changed, the digest value may be recalculated on the basis of the retained value of the internal state and the value of the finalization vector after the change, as described above. Then, in a case where the value of the initialization vector is changed, the values of internal states and digest values may be recalculated for all of path names.

Figure 5:
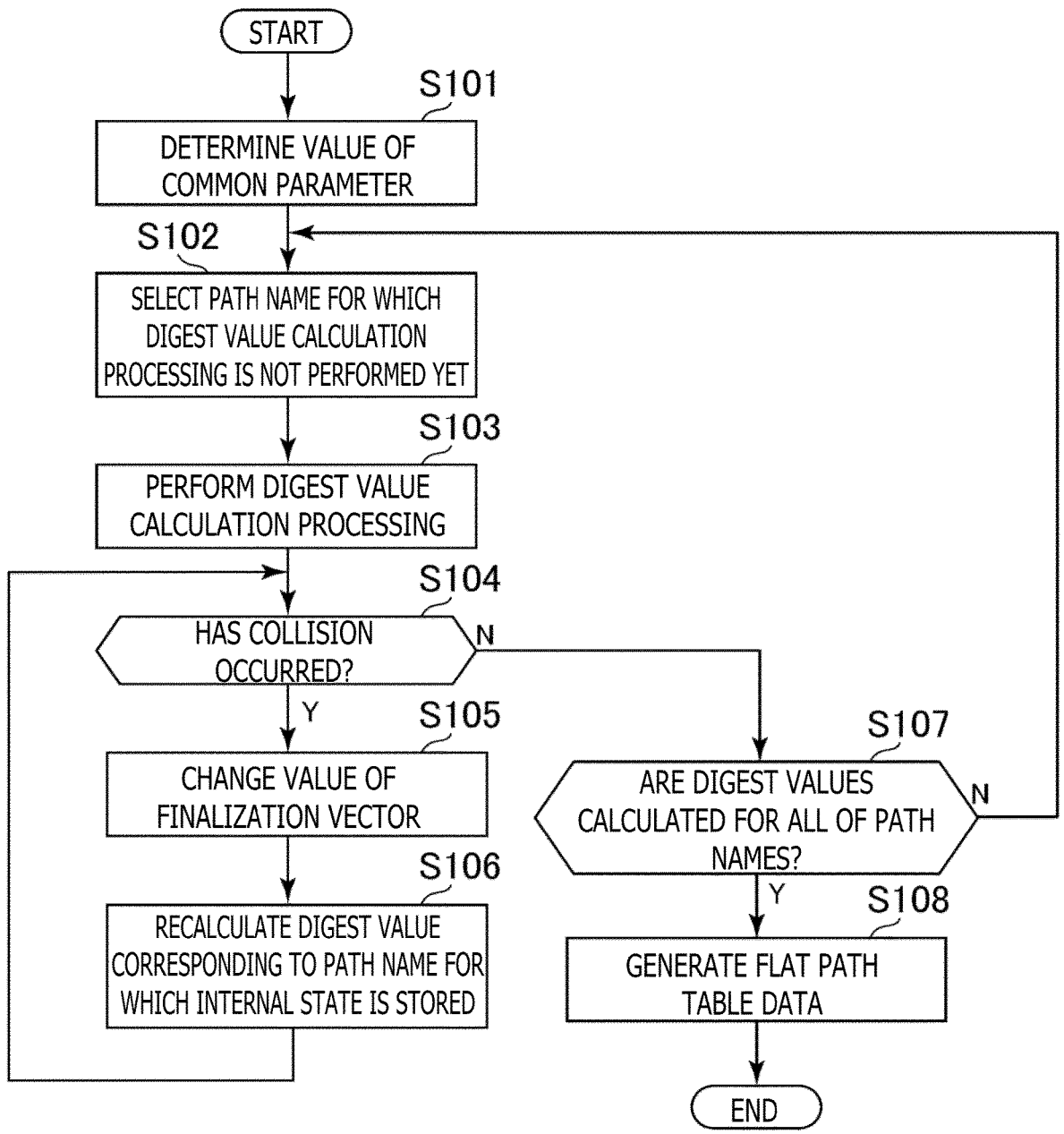
FIG. 5 is a flowchart illustrating an example of a flow of processing performed by the information processing device according to one embodiment of the present invention.

An example of a flow of processing performed in the information processing device 10 according to the present embodiment will be described in the following with reference to a flowchart illustrated in FIG. 5.

First, the parameter value determining section 22 determines the value of the common parameter (S101). Here, the value of the initialization vector and the value of the finalization vector are determined.

Then, the digest value calculating section 24 selects one path name of an object for which digest value calculation processing illustrated in S103 is not performed yet (S102).

Then, the digest value calculating section 24 performs the digest value calculation processing based on the path name selected by the processing illustrated in S102 (S103). Though details of the processing illustrated in S103 will be described later, the processing illustrated in S103 generates a record including digest value data representing a digest value corresponding to the path name selected by the processing illustrated in S102.

Then, the collision identifying section 30 identifies whether or not collision of the digest value calculated by the processing illustrated in S103 has occurred (S104). Here, for example, the occurrence of collision is identified in a case where a plurality of calculated digest values coincide with each other.

In a case where the occurrence of the collision is identified (S104: Y), the parameter value determining section 22 changes the value of the finalization vector (S105).

Then, the digest value calculating section 24 recalculates the digest value for the path name for which a corresponding internal state is stored (S106). The digest value calculating section 24 then returns to the processing illustrated in S104. The processing illustrated in S106 updates the value of the digest value data included in the record generated by the processing illustrated in S205 to be described later.

In a case where nonoccurrence of the collision is identified by the processing illustrated in S104 (S104: N), the digest value calculating section 24 determines whether or not digest values are calculated for all of the path names (S107).

A return is made to the processing illustrated in S102 in a case where it is determined that digest values are not calculated for all of the path names (S107: N).

In a case where it is determined that digest values are calculated for all of the path names (S107: Y), the record generating section 28 generates flat path table data (S108). The processing illustrated in the present processing example is then ended. The flat path table data, for example, includes a plurality of records generating by the processing illustrated in S205 to be described later. In addition, the flat path table data, for example, includes initialization vector data representing the value of a final initialization vector and finalization vector data representing the value of a final finalization vector.

As described above, the value of the initialization vector may be changed in a case where the processing illustrated in S104 to S106 is performed predetermined times or more consecutively. Then, the information processing device 10 may discard already generated records, and start anew the processing from S102 on down for all of the path names.

Figure 6:
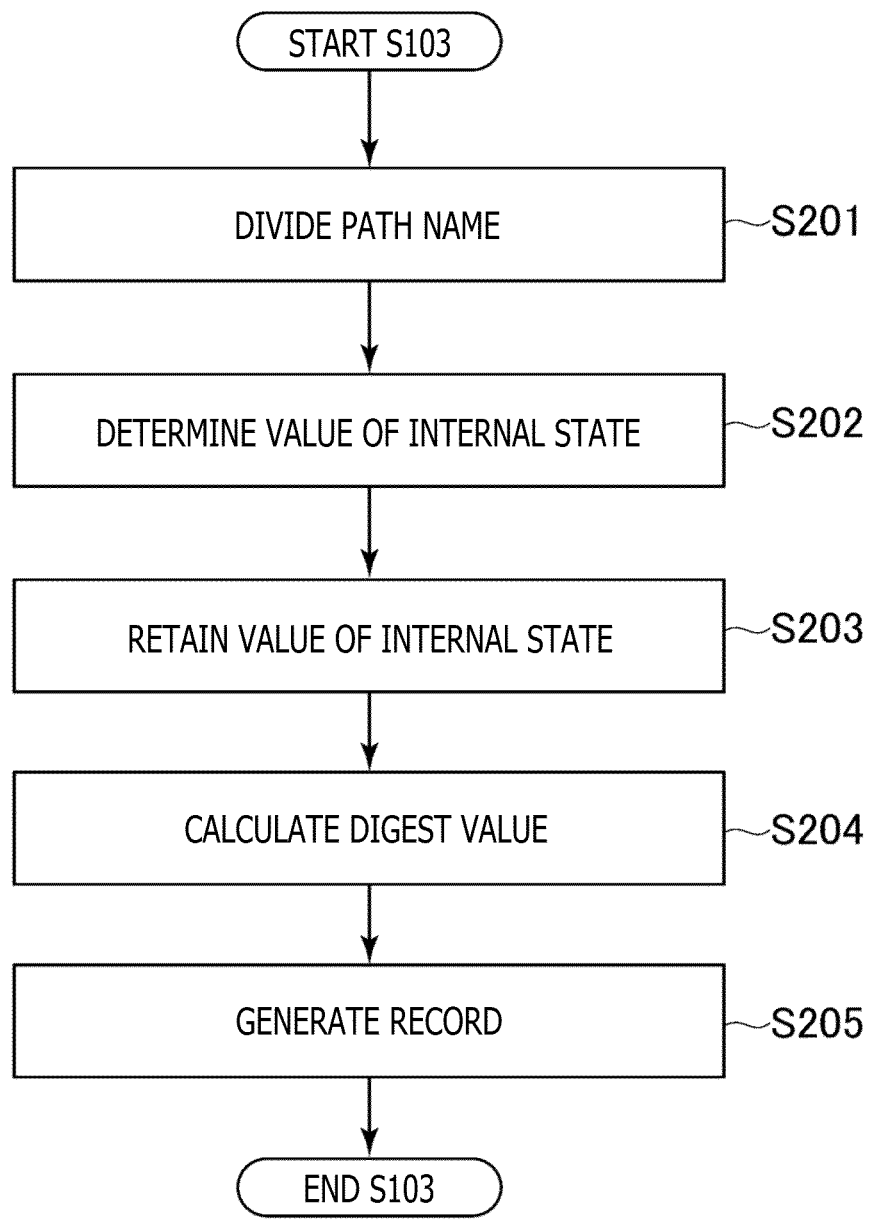
FIG. 6 is a flowchart illustrating an example of a flow of processing performed by the information processing device according to one embodiment of the present invention.

Next, referring to a flowchart illustrated in FIG. 6, description will be made of an example of a flow of the digest value calculation processing (see S103) based on the path name selected by the processing illustrated in S102, the digest value calculation processing being performed in the information processing device 10 according to the present embodiment.

First, the digest value calculating section 24 generates a plurality of blocks B described above by dividing the path name selected by the processing illustrated in S102 (S201). Here, suppose that B(1) to B(n), for example, are generated.

Then, the digest value calculating section 24 determines the value of an internal state corresponding to the path name selected by the processing illustrated in S102 (S202).

FIG. 7 is a diagram illustrating an example of a source code representing the contents of the digest value calculation processing.

In the processing illustrated in S202, first, the values of variables a[0], a[1], and a[2] are calculated on the basis of the value of the initialization vector (see (1) in FIG. 7). The value of the initialization vector itself is set as the value of the variable a[0]. A value obtained by rotating the value of the initialization vector by 11 bits is set as the value of the variable a[1]. A value obtained by rotating the value of the initialization vector by 23 bits is set as the value of the variable a[2].

Here, rotation by N bits corresponds to processing of moving N bits at the tail of a value to a head thereof. That is, a value obtained by moving 11 bits at the tail of the value of the initialization vector to the head thereof is set as the value of the variable a[1]. A value obtained by moving 23 bits at the tail of the value of the initialization vector to the head thereof is set as the value of the variable a[2].

Then, in order of the blocks B(1) to B(n−1), internal state update processing using the values of the blocks B as an argument is performed (see (2) in FIG. 7). In FIG. 7, the value of the argument is expressed as round input. Here, for example, the value of the variable a[0] is first updated to the value of an exclusive disjunction (XOR) of the present value of the variable a[0] and the value of the block B in question as the argument. Then, a value obtained by rotating an exclusive disjunction of the value of the variable a[0] and the value of the variable a[1] by 5 bits is set as the value of a variable v[0]. Then, a value obtained by rotating an exclusive disjunction of the value of the variable a[2] and the value of the variable a[0] by 17 bits is set as the value of a variable v[1]. Then, a value obtained by rotating an exclusive disjunction of the value of the variable a[0] and the value of the variable a[1] by 1 bit is set as the value of a variable v[2].

Then, a value obtained by rotating an exclusive disjunction of the value of the variable a[0] and the value of the variable v[0] by 53 bits is set as the value of a variable t[0]. Then, a value obtained by rotating an exclusive disjunction of the value of the variable a[1] and the value of the variable v[1] by 11 bits is set as the value of a variable t[1]. Then, a value obtained by rotating an exclusive disjunction of the value of the variable a[2] and the value of the variable v[2] by 59 bits is set as the value of a variable t[2].

Then, the value of the variable a[0] is updated to the value of an exclusive disjunction of the value of the variable t[0], a logic product (AND) of a value obtained by bit inversion of the value of the variable t[1] and the value of the variable t[2], and the value of a constant rc. Then, the value of the variable a[1] is updated to the value of an exclusive disjunction of the value of the variable t[1] and a logic product of a value obtained by bit inversion of the value of the variable t[2] and the value of the variable t[0]. Then, the value of the variable a[2] is updated to the value of an exclusive disjunction of the value of the variable t[2] and a logic product of a value obtained by bit inversion of the value of the variable t[0] and the value of the variable t[1].

As described above, in order of the blocks B(1) to B(n−1), the above processing using the blocks B as an argument is performed.

Then, the digest value calculating section 24 makes the internal state retaining section 26 retain the value of the internal state determined by the processing illustrated in S202 (S203). Here, the internal state retaining section 26 retains the values of the variables a[0], a[1], and a[2] (value of the internal state) at a time of an end of the internal state update processing on the block B(n−1), for example.

Then, the digest value calculating section 24 calculates a digest value based on the path name selected by the processing illustrated in S102 on the basis of the value of the internal state which value is retained by the processing illustrated in S203 and the value of the finalization vector (S204).

Here, for example, internal state update processing is performed which uses the value of an exclusive disjunction of the value of the block B(n) and the value of the finalization vector as an argument (see (3) in FIG. 7). The internal state update processing uses the variables a[0], a[1], and a[2] retained in the internal state retaining section 26. Then, the value of the variable a[0] at a time of an end of the internal state update processing is determined as the digest value based on the path name selected by the processing illustrated in S102.

Then, the record generating section 28 generates a new record (S205). The processing illustrated in the present processing example is then ended. Here, for example, a record is generated which includes digest value data representing the digest value calculated by the processing illustrated in S204, path name data representing the path name selected by the processing illustrated in S102, and the inode number of the object corresponding to the path name.

Figure 8:
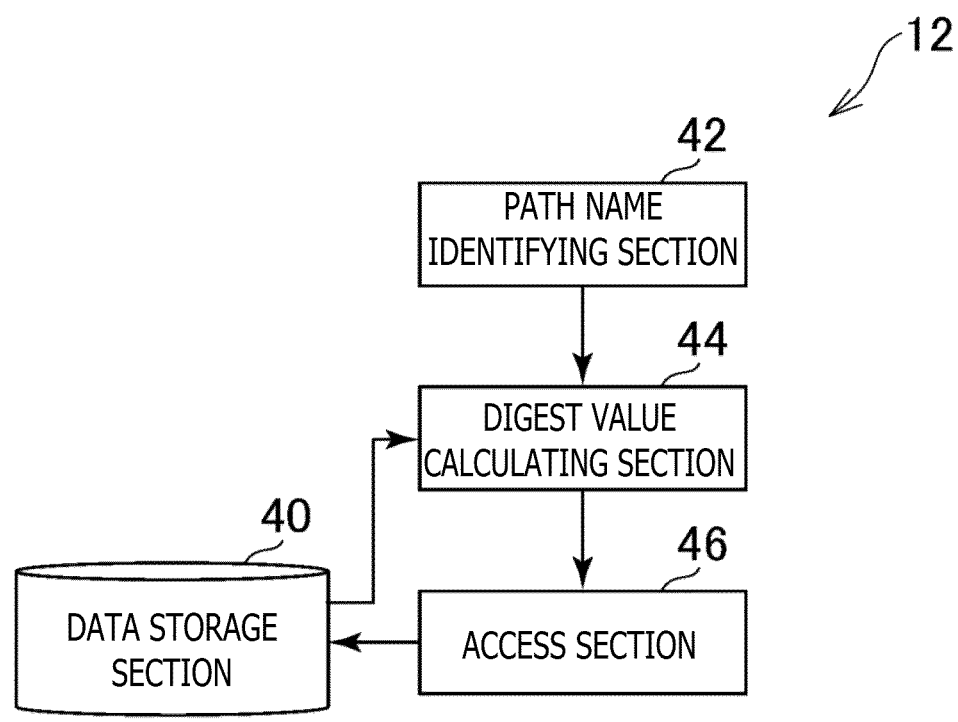
FIG. 8 is a functional block diagram illustrating an example of functions of an information processing device according to one embodiment of the present invention, the information processing device being used by a second user.

FIG. 8 is a functional block diagram illustrating an example of functions implemented in the information processing device 12 according to the present embodiment. It is to be noted that the information processing device 12 according to the present embodiment does not need to implement all of the functions illustrated in FIG. 8, and may implement functions other than the functions illustrated in FIG. 8.

As illustrated in FIG. 8, the information processing device 12 functionally includes, for example, a data storage section 40, a path name identifying section 42, a digest value calculating section 44, and an access section 46. The data storage section 40 is implemented mainly by the storage section 12b. The path name identifying section 42, the digest value calculating section 44, and the access section 46 are implemented mainly by the processor 12a.

The above functions may be implemented by executing a program including commands corresponding to the above functions in the processor 12a, the program being installed on the information processing device 12 as a computer. This program may, for example, be supplied to the information processing device 12 via a computer readable information storage medium such as an optical disk, a magnetic disk, a magnetic tape, a magneto-optical disk, or a flash memory or via the Internet or the like. In addition, this program may be supplied from the information processing device 10 to the information processing device 12.

The data storage section 40 in the present embodiment, for example, stores the distribution data including objects such as a plurality of files or directories developed by the information processing device 10 and the flat path table data. As described above, the distribution data includes the initialization vector data and the finalization vector data representing the value of the common parameter. In addition, the distribution data includes records indicating correspondences between digest values and inodes.

The path name identifying section 42 in the present embodiment, for example, identifies the name of a path. The path name identifying section 42, for example, identifies the path name of an object requested to be accessed at a time of execution of the program in the information processing device 12.

The digest value calculating section 44 in the present embodiment, for example, calculates a digest value based on the path name identified by the path name identifying section 42.

The access section 46 in the present embodiment, for example, accesses an inode associated with the digest value calculated by the digest value calculating section 44 in the distribution data. The access section 46, for example, identifies a record including the digest value calculated by the digest value calculating section 44. Then, the access section 46, for example, accesses an inode corresponding to an inode number included in the record.

Figure 9:
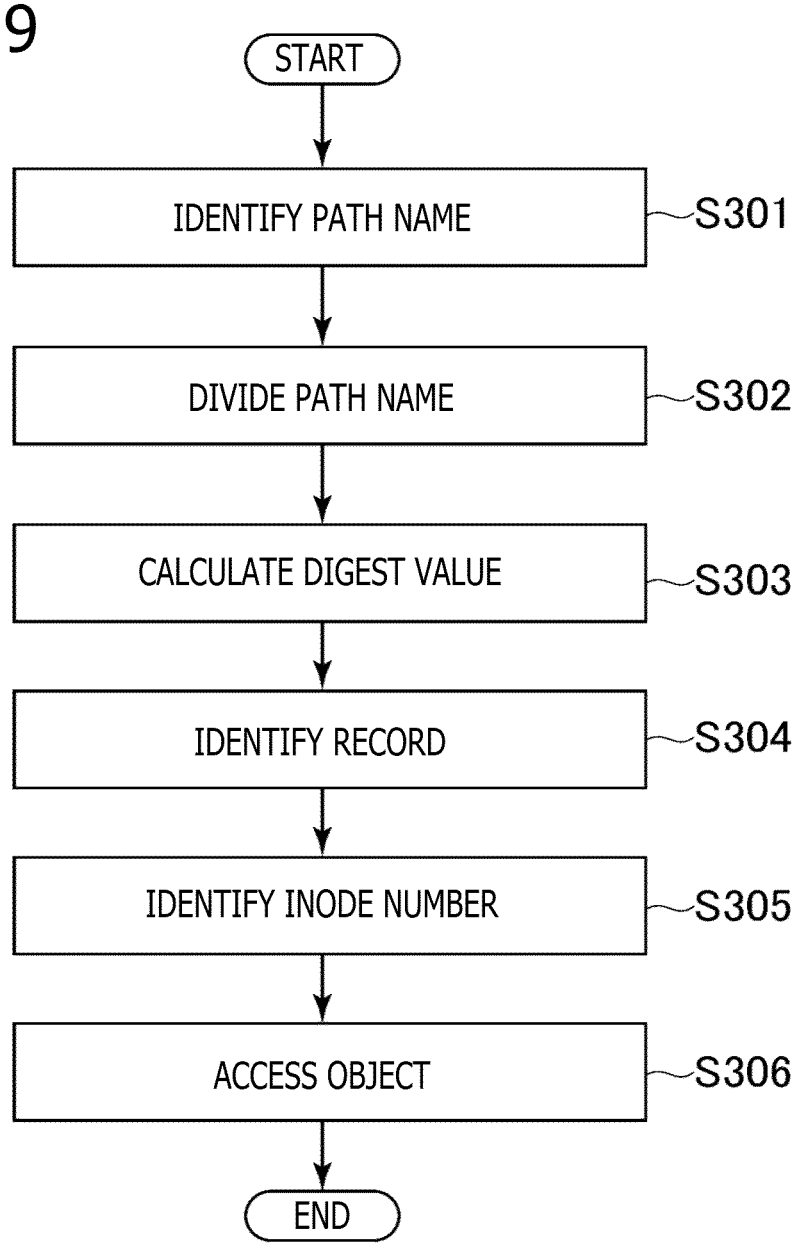
FIG. 9 is a flowchart illustrating an example of a flow of processing performed by the information processing device according to one embodiment of the present invention.

An example of a flow of processing performed in the information processing device 12 according to the present embodiment will be described in the following with reference to a flowchart illustrated in FIG. 9.

First, the path name identifying section 42 identifies a path name requested to be accessed (S301).

Then, the digest value calculating section 44 generates a plurality of blocks B described above by dividing the path name identified by the processing illustrated in S301 (S302). Here, suppose that B(1) to B(n), for example, are generated.

Then, the digest value calculating section 44 calculates a digest value based on the path name identified by the processing illustrated in S301 (S303).

Here, for example, the values of the variables a[0], a[1], and a[2] are calculated on the basis of the value of the initialization vector which value is represented by the initialization vector data included in the flat path table data (see (1) in FIG. 7).

Then, in order of the blocks B(1) to B(n−1), internal state update processing using the values of the blocks B as an argument is performed (see (2) in FIG. 7).

Then, internal state update processing is performed which uses the value of an exclusive disjunction of the value of the block B(n) and the value of the finalization vector represented by the finalization vector data included in the flat path table data as an argument (see (3) in FIG. 7). The value of the variable a[0] at a time of an end of the internal state update processing is determined as the digest value based on the path name identified by the processing illustrated in S301.

Then, the access section 46 identifies a record including the digest value calculated by the processing illustrated in S303 (S304).

Then, the access section 46 identifies an inode number included in the record identified by the processing illustrated in S304 (S305).

Then, the access section 46 accesses an inode identified by the inode number identified by the processing illustrated in S305 and an object corresponding to the inode (S306). The processing illustrated in the present processing example is then ended.

In the present embodiment, when the paths of all objects are determined, digest values that correspond to the respective paths and do not collide with each other are determined. There is thus no need for a collision resolver that manages the paths of the objects and inode numbers in association with each other. Thus, the present embodiment can prevent access to an inode from taking time because a full-text matching search of the collision resolver is made with a path as a key.

In addition, in the present embodiment, even when a calculation load of an algorithm for calculating a digest value is light, there is a strong possibility of being able to ultimately prevent digest values from colliding with each other in the information processing device 10 by changing the value of the common parameter and recalculating the digest value. Thus, according to the present embodiment, the digest value is calculated on the basis of the common parameter used in common by the information processing device 10 and the information processing device 12, and thereby a possibility of collision between digest values is decreased even though the calculation load is light.

It is to be noted that the present invention is not limited to the foregoing embodiment.

In addition, concrete character strings and numerical values in the above description and concrete character strings and numerical values in the drawings are illustrative, and are not limited to these character strings and numerical values.

The invention claimed is:

1. A digest value calculating device comprising:
circuitry configured to:
determine a value of a common parameter used in common for each of a plurality of paths respectively associated with Modes;
calculate, for each of the plurality of paths, a digest value corresponding to the path on a basis of the value of the common parameter and a name of the path;
associate the digest value corresponding to the path and an Mode corresponding to the path with each other;
determine a value of a first common parameter and a value of a second common parameter;
calculate a value of an internal state on a basis of a part of the name of the path and the value of the first common parameter; and
recalculate the digest value on a basis of the value of the internal state, a remainder of the name of the path, and the value of the second common parameter.

2. The digest value calculating device according to claim 1, wherein the circuitry is further configured to:
identify collision between the calculated digest values,
change the value of the common parameter when the collision between the digest values is identified, and
recalculate the digest value on a basis of the value of the common parameter after the change.

3. The digest value calculating device according to claim 1, wherein the circuitry is further configured to:
identify collision between the calculated digest values,
retain the value of the internal state,
change the value of the second common parameter when the collision between the digest values is identified, and
recalculate the digest value on a basis of the retained value of the internal state and the value of the second common parameter after the change.

4. The digest value calculating device according to claim 3, wherein,
when the collision between the digest values is identified, the circuitry changes either the value of the first common parameter or the value of the second common parameter according to a mode of the collision, in a case where the value of the second common parameter is changed, the circuitry recalculates the digest value on the basis of the retained value of the internal state and the value of the second common parameter after the change, and, in a case where the value of the first common parameter is changed, the circuitry recalculates the value of the internal state and the digest value on a basis of the value of the first common parameter after the change.

5. A digest value calculating method comprising:

determining a value of a common parameter used in common for each of a plurality of paths respectively associated with modes;

calculating, for each of the plurality of paths, a digest value corresponding to the path on a basis of the value of the common parameter and a name of the path;

associating the digest value corresponding to the path and an inode corresponding to the path with each other;

determining a value of a first common parameter and a value of a second common parameter;

calculating a value of an internal state on a basis of a part of the name of the path and the value of the first common parameter; and recalculating the digest value on a basis of the value of the internal state, a remainder of the name of the path, and the value of the second common parameter.

6. A non-transitory computer-readable medium storing executable instructions, which when executed by circuitry, cause the circuitry to perform a method r, the method comprising:

determining a value of a common parameter used in common for each of a plurality of paths respectively associated with inodes;

calculating, for each of the plurality of paths, a digest value corresponding to the path on a basis of the value of the common parameter and a name of the path;

associating the digest value corresponding to the path and an inode corresponding to the path with each other;

determining a value of a first common parameter and a value of a second common parameter;

calculating a value of an internal state on a basis of a part of the name of the path and the value of the first common parameter; and recalculating the digest value on a basis of the value of the internal state, a remainder of the name of the path, and the value of the second common parameter.

* * * * *